No. 753,101. PATENTED FEB. 23, 1904.
J. W. PAXTON.
METHOD OF MAKING GLASS WITH WIRE EMBEDDED THEREIN.
APPLICATION FILED JUNE 3, 1903.
NO MODEL.
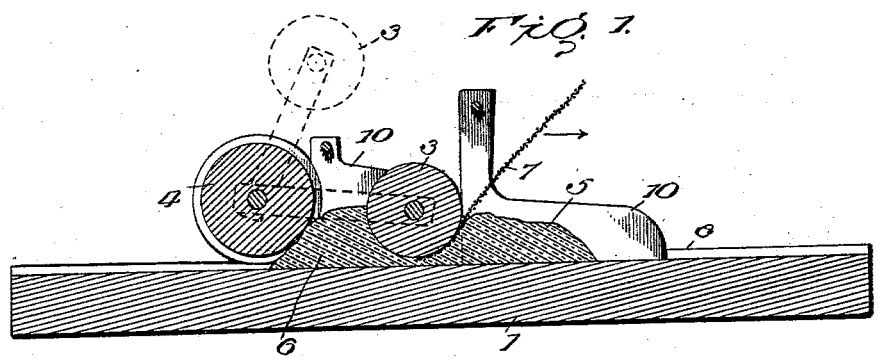
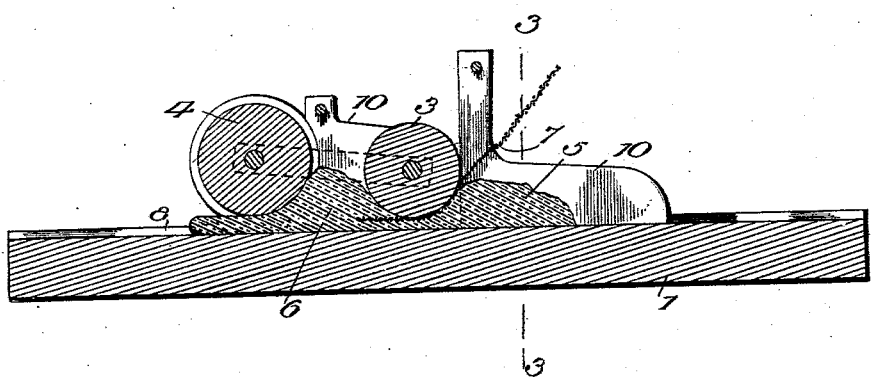
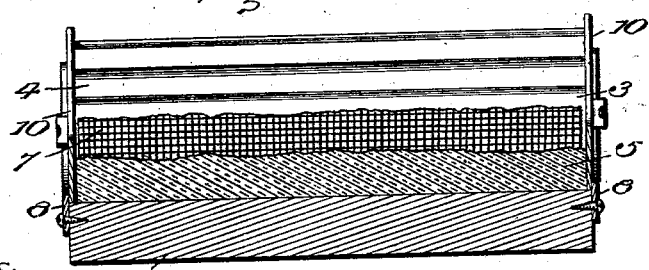
WITNESSES:
INVENTOR
J. W. Paxton,
BY
A. S. Pattison, Attorney No. 753,101. Patented February 23, 1904.

UNITED STATES PATENT OFFICE.

JESSE W. PAXTON, OF WASHINGTON, PENNSYLVANIA.

METHOD OF MAKING GLASS WITH WIRE EMBEDDED THEREIN.

SPECIFICATION forming part of Letters Patent No. 753,101, dated February 23, 1904.

Application filed June 3, 1903. Serial No. 159,923. (No model.)

*To all whom it may concern:*

Be it known that I, JESSE W. PAXTON, a citizen of the United States, residing at Washington, in the county of Washington and State of Pennsylvania, have invented new and useful Improvements in Methods of Making Glass with Wire Embedded Therein, of which the following is a specification.

My invention relates to improvements in the method of making glass with wire embedded therein, which will be fully described hereinafter.

The object of my invention is to provide glass with wire-netting embedded therein from a single batch or ladle of glass, whereby a homogeneous product is provided.

In carrying out my method I place on a suitable table a single ladle or batch of glass, divide this batch at an intermediate point, start the wire at the divided point, and then spread the front portion of the batch under the wire and the rear portion over the wire, thus embedding the wire-netting therein and producing a thoroughly homogeneous product from a single ladle or batch of glass.

For the purpose of enabling my invention to be fully understood I will illustrate it in the accompanying drawings, in which—

Figure 1 is a longitudinal sectional view of one form of apparatus adapted to carry out my method and showing one part of the method. Fig. 2 is a similar view showing the apparatus carrying out another part of my method. Fig. 3 is a cross-sectional view on the line 3 3 of Fig. 2.

My method is capable of being practiced by hand, but can be more expeditiously carried out by means of an apparatus of the general character herein shown.

Referring now to the drawings, 1 indicates a table, upon which a single ladle or batch of glass is placed. A roll 3 is adapted to be raised and lowered in respect to the table, as shown in Fig. 1, and is the forward roll. A second roll 4 is provided and is the rear roll.

The roll 3 is elevated and a single batch or ladle of glass is placed on the table and the roll then lowered, which divides the batch into a front portion 5 and a rear portion 6. The wire-netting 7 is introduced at the divided point. Flanges 8 at the edges of the table serve to hold the front roll the desired distance from the table to regulate the thickness of the glass rolled by it, and the rear roll 4 is held higher above the table—as, for instance, by collars engaging the said flanges—and in this way the thickness of the finished product is controlled. The rolls are then moved in the direction indicated by arrow. Roll 3 spreads the forward portion of the batch of glass the desired thickness beneath the wire-netting and roll 4 spreads the rear portion of the batch of glass the desired thickness above the wire-netting, thus producing a finished product which is thoroughly homogeneous and in a very simple and effective manner. Guides 10, which are placed at the sides of the table, determine the width of the article, and these guides slide along in front of the rolls.

It will be readily understood that my method can be practiced by making the table 1 movable beneath the rolls instead of moving the rolls over the table.

Having thus described my invention, what I claim as new, and desire to secure by Letters Patent, is—

1. The method of making sheet-glass with a metallic center portion, consisting in depositing a single batch of glass upon a suitable support, then dividing it into a front and a rear portion, introducing the metallic center at the divided point, then spreading the front portion of the glass below the metallic center and the rear portion above the metallic center.

2. The method of making sheet-glass with a metallic center portion which consists in depositing a single batch of glass upon a suitable support, then dividing it into a front and a rear portion, introducing the metallic center at the divided point, and simultaneously spreading the front portion of the glass under the metallic center and the rear portion above the metallic center.

In testimony whereof I have hereunto set my hand in the presence of two subscribing witnesses.

JESSE W. PAXTON.

Witnesses:
B. M. PAXTON,
ROBT. M. TORRENCE.